(12) United States Patent
Eaton

(10) Patent No.: US 7,551,378 B2
(45) Date of Patent: *Jun. 23, 2009

(54) TRI-STATE SERVOWRITER DRIVER WITH SLOW RETURN TO ZERO

(75) Inventor: James Howard Eaton, Morgan Hill, CA (US); Glynda Williams Eaton, legal representative, Morgan Hill, CA (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/830,869

(22) Filed: Jul. 31, 2007
(Under 37 CFR 1.47)

(65) Prior Publication Data

US 2007/0268616 A1 Nov. 22, 2007

Related U.S. Application Data

(63) Continuation of application No. 10/999,383, filed on Nov. 30, 2004, now Pat. No. 7,280,294.

(51) Int. Cl.
*G11B 5/09* (2006.01)
*G11B 21/02* (2006.01)
*G11B 5/596* (2006.01)
(52) U.S. Cl. ................... 360/48; 360/75; 360/77.12
(58) Field of Classification Search ................ None
See application file for complete search history.

(56) References Cited

U.S. PATENT DOCUMENTS

| | | | |
|---|---|---|---|
| 4,970,621 A | 11/1990 | Gailbreath et al. |
| 5,010,430 A | 4/1991 | Yamada et al. |
| 5,095,393 A | 3/1992 | Janz |
| 5,168,395 A | 12/1992 | Klaassen et al. |
| 5,572,392 A | 11/1996 | Aboaf et al. |
| 5,867,334 A | 2/1999 | Soichi et al. |
| 5,894,237 A | 4/1999 | Brannon et al. |

(Continued)

FOREIGN PATENT DOCUMENTS

JP 2001-109758 A1 4/2001

OTHER PUBLICATIONS

Eisele, et al., "DC Equalizing Write Driver," IBM Technical Disclosure Bulletin, vol. 18, No. 1, Jun. 1975, pp. 252-253.

*Primary Examiner*—Joseph H Feild
*Assistant Examiner*—Daniell L Negrón
(74) *Attorney, Agent, or Firm*—Gibb I.P. Law, LLC

(57) ABSTRACT

A method and apparatus for writing timing-based magnetic servo band patterns on magnetic storage media. The apparatus includes a magnetic head and a tri-state driver. The driver is adapted to control three magnetic head states including two writes states having positive and negative current outputs, respectively, for performing a write sequence and a rest state, having no current output for avoiding overwriting of the magnetic pattern between write sequences. The driver is further adapted to gradually change the magnetic head state from a rest state to a write state before beginning a write sequence and to gradually change the magnetic head state back to a rest state upon completing a write sequence. Thus, strong uniform signal pulses are produced upon playback of the magnetic pattern.

6 Claims, 8 Drawing Sheets

U.S. PATENT DOCUMENTS

| | | |
|---|---|---|
| 5,910,861 A | 6/1999 | Ahn |
| 5,946,157 A | 8/1999 | Codilian et al. |
| 6,169,640 B1 | 1/2001 | Fasen |
| 6,252,736 B1 | 6/2001 | Mattison |
| 6,271,977 B1 | 8/2001 | Chung et al. |
| 6,301,068 B1 | 10/2001 | Ionescu |
| 6,320,719 B1 | 11/2001 | Albreeht et al. |
| 6,510,012 B1 | 1/2003 | Chaiken et al. |
| 6,532,123 B1 | 3/2003 | Veenstra et al. |
| 6,670,827 B2 | 12/2003 | Strzalkowski |
| 6,678,116 B2 | 1/2004 | Dugas |
| 7,280,294 B2 * | 10/2007 | Eaton et al. .................... 360/48 |
| 2003/0090828 A1 | 5/2003 | Venca et al. |
| 2003/0095353 A1 * | 5/2003 | Nakao ......................... 360/75 |
| 2003/0184901 A1 | 10/2003 | Takahashi |

\* cited by examiner

TRI-STATE SERVOWRITER DRIVER WITH SLOW RETURN TO ZERO

CROSS-REFERENCE TO RELATED APPLICATIONS

This application is a continuation of U.S. application Ser. No. 10/999,383 filed Nov. 30, 2004, now U.S. Pat. No. 7,280,294 the complete disclosure of which, in its entirety, is herein incorporated by reference.

BACKGROUND OF THE INVENTION

1. Field of the Invention

This invention relates to magnetic storage media and more specifically to an apparatus and method for writing timing-based servo patterns on magnetic storage media.

2. Description of the Related Art

Magnetic storage media such as linear tape storage systems are commonly used for storing large amounts of digital data. The data is formatted by magnetic heads on linear tapes in a plurality of tracks that extend longitudinally along the tape. Servo band patterns on the tapes are read by the magnetic heads when reading from or writing onto the tape in order to ensure accurate lateral positioning of the magnetic heads relative to the tape. These servo bands are prewritten onto the tapes by magnetic heads controlled by uni-polar drivers (positive or negative), such that transitions between bands have zero current. U.S. Pat. No. 6,169,640 issued to Fasen on Jan. 2, 2001 for "Servo Band Identification in Linear Tape Systems Having Timing Based Servo Formats" describes in detail a number of approaches by which servo bands are formatted and used to derive lateral position information. U.S. Pat. No. 6,169,640 to Fasen discloses embodiments that were satisfactory for the purposes for which they were intended and its disclosure in its entirety, is hereby expressly incorporated by reference into the present invention for purposes including, but not limited to, indicating the background of the present invention and illustrating the state of the art. Weak read-back signals from the servo bands can decrease the accuracy of lateral position of magnetic heads. There is a need for an apparatus for writing timing-based servo patterns onto magnetic linear tapes which increases read-back signal strength.

SUMMARY OF THE INVENTION

One embodiment of the invention is an apparatus for writing timing-based servo patterns on magnetic storage media. The apparatus comprises a magnetic head. The apparatus also comprises a tri-state driver for controlling the output of write currents of the magnetic head to be either negatively charged (i.e., a negative write state) or positively charged (i.e., a positive write state). The tri-state driver further controls rest states, when the magnetic head does not output a write current, and the transitions before and after rest states. The tri-state driver is adapted to gradually transition the output of the magnetic head to a positive or negative current after a rest state before beginning to write a magnetic pattern onto a magnetic storage media. The driver is further adapted to gradually transition the output of the magnetic head from a positive or negative current upon completing the magnetic pattern before a rest state. By gradually transitioning the output of the magnetic head before and after a rest state, the driver produces uniform signal pulses upon playback of the magnetic pattern and the driver avoids half amplitude pulses at the beginning and ends of playback of the magnetic pattern.

While writing the magnetic pattern, the driver controls the magnetic head such that changes in the polarity of output of the magnetic head are more abrupt than when the driver gradually transitions the output from the magnetic head before and after a rest state. More specifically, when the driver gradually transitions the output of the magnetic head after and before a rest state, the transition time between a negative or positive current output and no output is preferably at least five times longer than the transition time during a write sequence when the magnetic head is alternating between write states and passes a point at which no current is output. Additionally, when the driver gradually changes the output of the magnetic head before and after a rest state, the transition time between one of the write states and the rest state is no greater than the time, during a write sequence, that transpires between the writing of centerlines of two consecutive servo bands in the magnetic pattern less the time it takes to write a single servo band in the magnetic pattern.

The magnetic head comprises a first angled write element and a second angled write element that are used to perform a gap recording process. The gap recording process simultaneously writes the magnetic pattern onto the storage media using the first and second angled write elements. The resultant magnetic pattern comprises a first pattern section and a second pattern section longitudinally offset and symmetrical relative to each other. To prevent recording over a previously recorded area on the storage media, the magnetic head enters a rest state such that there is no output from the magnetic head when the portion of the storage media containing the second pattern section passes the first angled write element. The magnetic head is a tri-state magnetic head that is adapted to record alternating negative and positive pulses on the magnetic storage media.

Another embodiment of the invention is a method of writing timing-based servo patterns on magnetic storage media. A recording medium is passed over a magnetic head. The magnetic head is controlled with a tri-state driver adapted to record alternating negative and positive pulses on a magnetic storage media during writing of the magnetic pattern and to control magnetic head rest states before and after writing the magnetic pattern. When writing a magnetic pattern onto a storage media, the magnetic head outputs a negative current or a positive current. When the magnetic head is alternating between outputting a positive current and a negative current, there is a point when no current is output. During a rest state, no current is output. Before beginning to write a magnetic pattern, the output from the magnetic head is gradually changed from a rest state to a write state (i.e., negative or positive current is output). Then, once the magnetic pattern is recorded, the magnetic head is gradually changed from a write state (i.e., a negative or positive current output) to a rest state.

As stated above, while writing the magnetic pattern, the magnetic head is adapted to change the polarity of output more abruptly than when the driver gradually changes the output from the magnetic head before and after a rest state. By gradually changing the output from the magnetic head before and after a rest state, the driver produces uniform signal pulses upon playback of the magnetic pattern and avoids half amplitude pulses at the beginning and ends of playback of the magnetic pattern. When the driver gradually changes the output of the magnetic head before and after a rest state, the transition time between the beginning or the ending of a rest state and a charged output is preferably at least five times longer than the transition time during the write sequence when the magnetic head is alternating between positive and negative write states and passes a point at which no current is output. Additionally, when the driver gradually changes the output of the magnetic head before and after a rest state, the transition time between one of the write states and the rest state is no greater than the time, during a write sequence, that transpires between the writing of centerlines of two consecutive servo bands in the magnetic pattern less the time it takes to write a single servo band in the magnetic pattern. The method also includes performing a gap recording process by using first and second angled write elements on the magnetic head to write the magnetic pattern on the storage media. The resulting magnetic pattern includes a first pattern section and a second pattern section longitudinally offset and symmetrical relative to each other. Lastly, the method includes the step of maintaining the magnetic head in a rest state, when the portion of the storage media containing the second write element passes the first angled write portion, to avoid overwriting.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
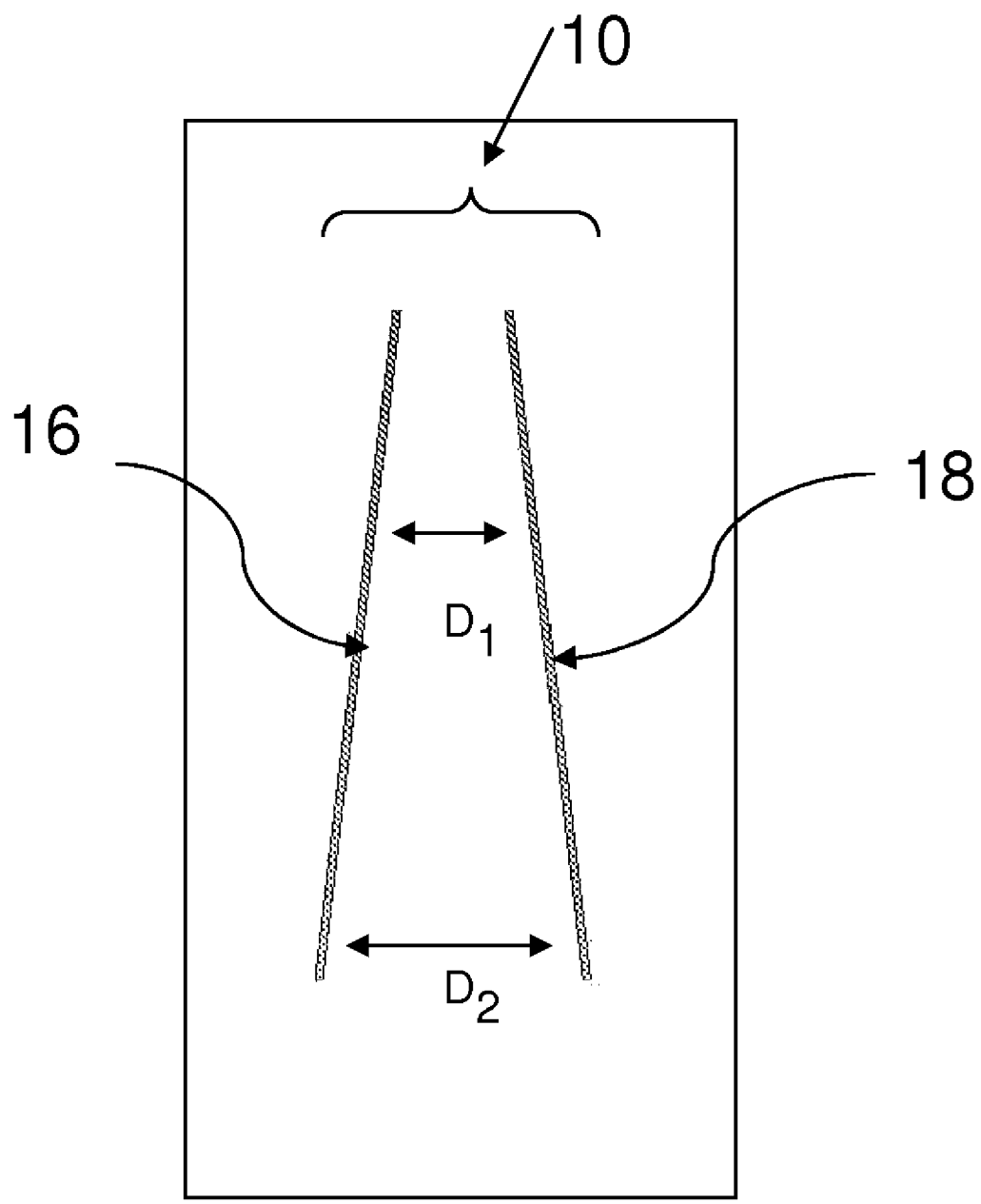
FIG. 1 is a schematic drawing illustrating a recording of a prior art magnetic servo pattern.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As stated above, prior art servo bands are prewritten onto the tapes by magnetic heads controlled by uni-polar drivers, such that the spaces between bands have a zero charge. Using a uni-polar driver produces weak read-back signals (i.e., low amplitude signals) because such drivers only allow for a zero output and a negative or positive current output. Weak read-back signals from the servo bands can decrease the accuracy of the lateral position of magnetic heads.

The present invention provides a method and an apparatus for creating stronger read-back signals when the servo band pattern is read by the servo reader. Specifically, it is a method and an apparatus for creating read-back signals that produce transitions from positive to negative magnetization rather than positive or negative to zero magnetization. One method of accomplishing this is to negatively magnetize the entire tape prior to recording the servo bands. However, this method disturbs the data storage area on the tape and is undesirable. Another method is to pre-magnetize only the areas where servo patterns are to be written. This can be accomplished by either (1) a separate pass with a special head or (2) a three gap head design where the third write element (gap) precedes the two angled write portions and is magnetized separately in order to magnetize the pattern area negatively before magnetizing positively with the two angled write portions in the usual manner. The three-gap head design involves an increased cost of an additional write element, increased circuit complexity associated with energizing three heads instead of two and the issues of magnetic crosstalk between the two angled heads and the one erase head.

FIG. 1 illustrates a sample recorded magnetic servo band pattern 10. This servo band pattern is described as a "two gap" band pattern and is created using special "two gap" recording heads. Specifically, the magnetic head used to create this pattern includes two angled writing portions (i.e., a first angled write portion and a second angled write portion). These writing portions create a magnetic pattern 10 on the tape with a first write element (first gap) 16 and a second write element (second gap) 18 longitudinally offset and symmetrical relative to each other. More specifically, the first and second write elements 16, 18 are positioned with respect to one another so that the time between the two elements is smaller at the top ($D_1$) of the servo band pattern than at the bottom ($D_2$). While FIG. 1 illustrates only one band or stripe in each write element, the recorded pattern may include multiple bands or stripes in each write element.

Figure 2:
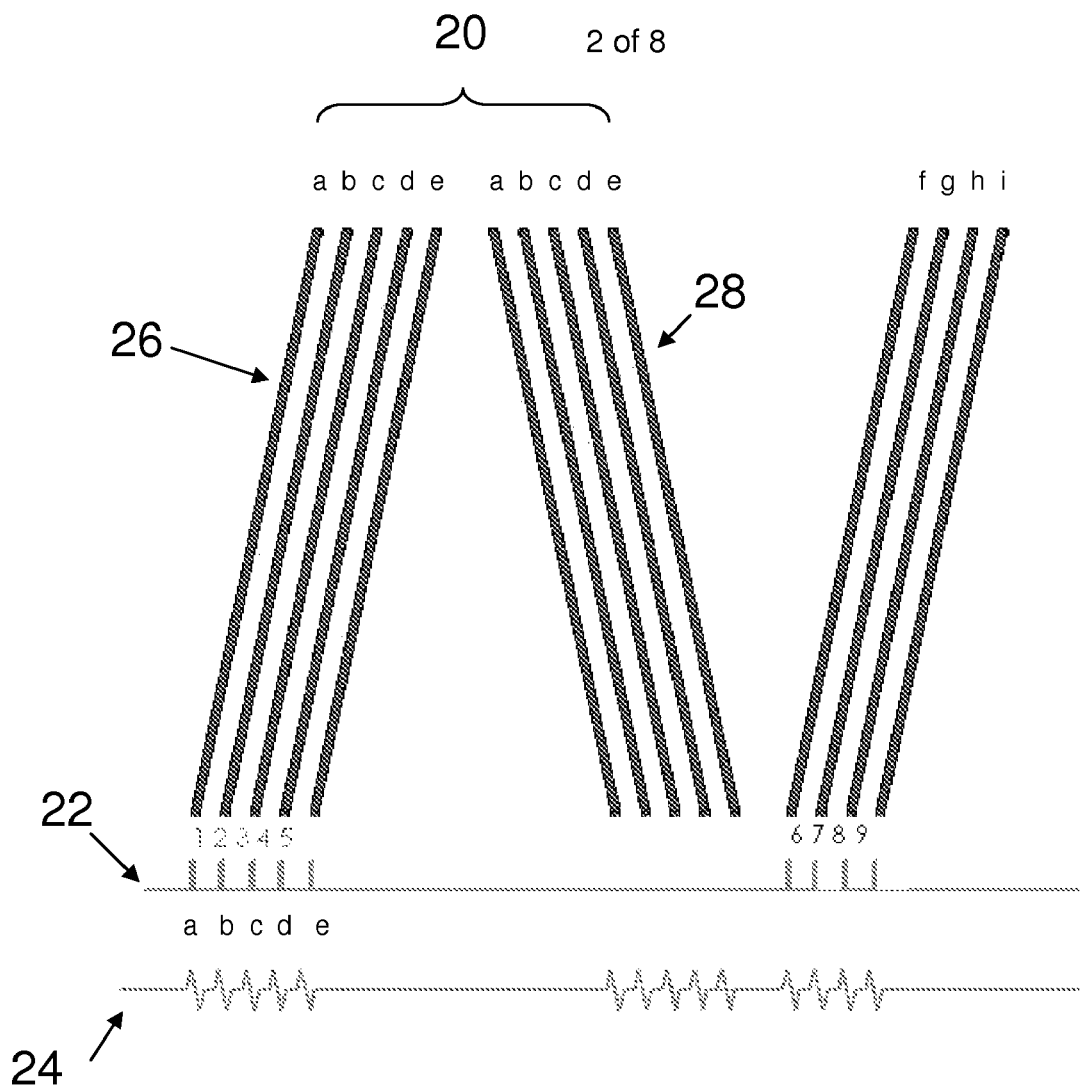
FIG. 2 is a schematic drawing illustrating a recording of a prior art magnetic servo pattern.

FIG. 2 illustrates a magnetic servo band pattern 20 written onto non-magnetized tape by a two gap recording head controlled by a uni-polar driver. As illustrated, each written magnetic pattern 20 includes two sections 26, 28 having 5 magnetic pulses (stripes on bands) a-e. These bands 26a-e, 28a-e represent the magnetized bands on the tape. The spaces between the bands 26a-e, 28a-e are not magnetized. The uni-polar driver utilized in this process outputs very narrow single polarity write pulses to the magnetic head to magnetize the write element bands 26a-e, 28a-e. Reference No. 22 is a reading of the pulses output from the write driver (output signal) during a write sequence. The pulses 22a-e correspond to the magnetized bands 26a-e and 28a-e. This process results in a positive and zero magnetic transition equal to approximately the width of the bands for each driver pulse, as illustrated by reference No. 24 (a graph of the analog servo read head signal illustrating the read-back pulses by a servo band reader).

Figure 3:
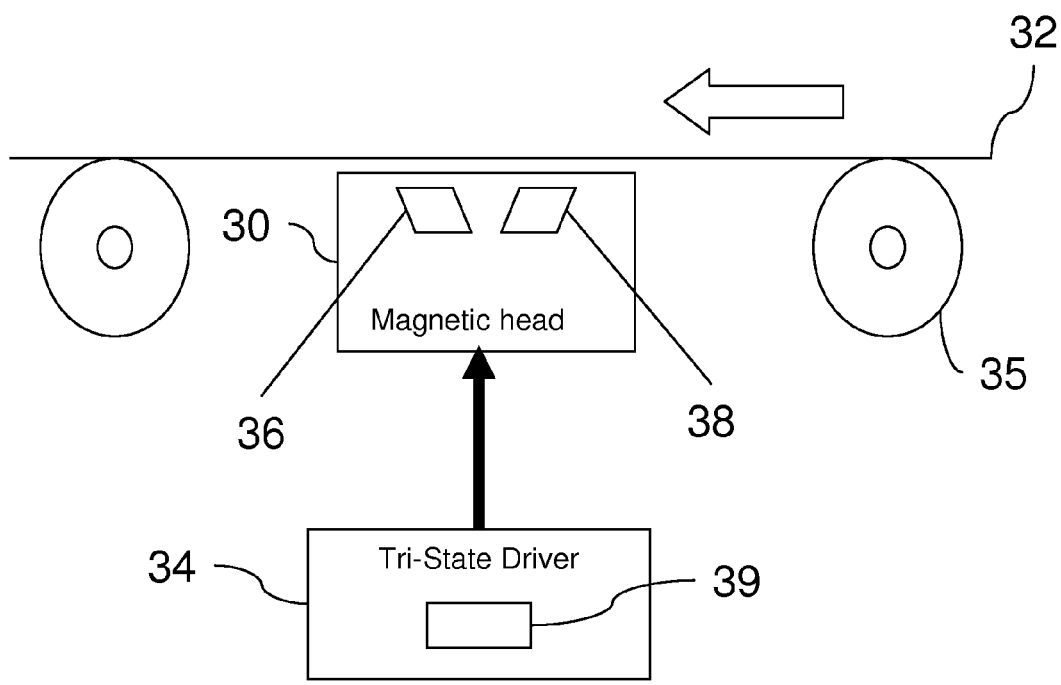
FIG. 3 is a schematic block diagram of an embodiment of the apparatus of the invention.

FIG. 3 is a schematic block diagram of an embodiment of the apparatus of the invention. The apparatus includes a magnetic head 30 and a tri-state driver 34. In use, a magnetic storage media (linear tape) 32 is moved (i.e. by roller system 35) over the magnetic head 30. As the tape 32 passes by, the magnetic head 30 reads from or writes onto the tape 32. The tri-state driver 34 is a three state driver meaning that it controls the magnetic head 30 such that the magnetic head 30 has three states. These states comprise the two write states when the magnetic head 30 is outputting a positive current (i.e., positive current write state) or negative current (i.e., negative current write state) and a rest state, when the magnetic head 30 does not output any current. The tri-state driver thus controls the output of pulses from the magnetic head 30, such there is a negative or positive current output or no output. The magnetic head 30 is a two gap recording head that includes a first angled write element 36 and a second angled write element 38 that are used to perform a gap recording process. The gap recording process simultaneously writes the magnetic pattern onto the storage media 32 using the first and second angled write elements 36, 38.

Figure 4:
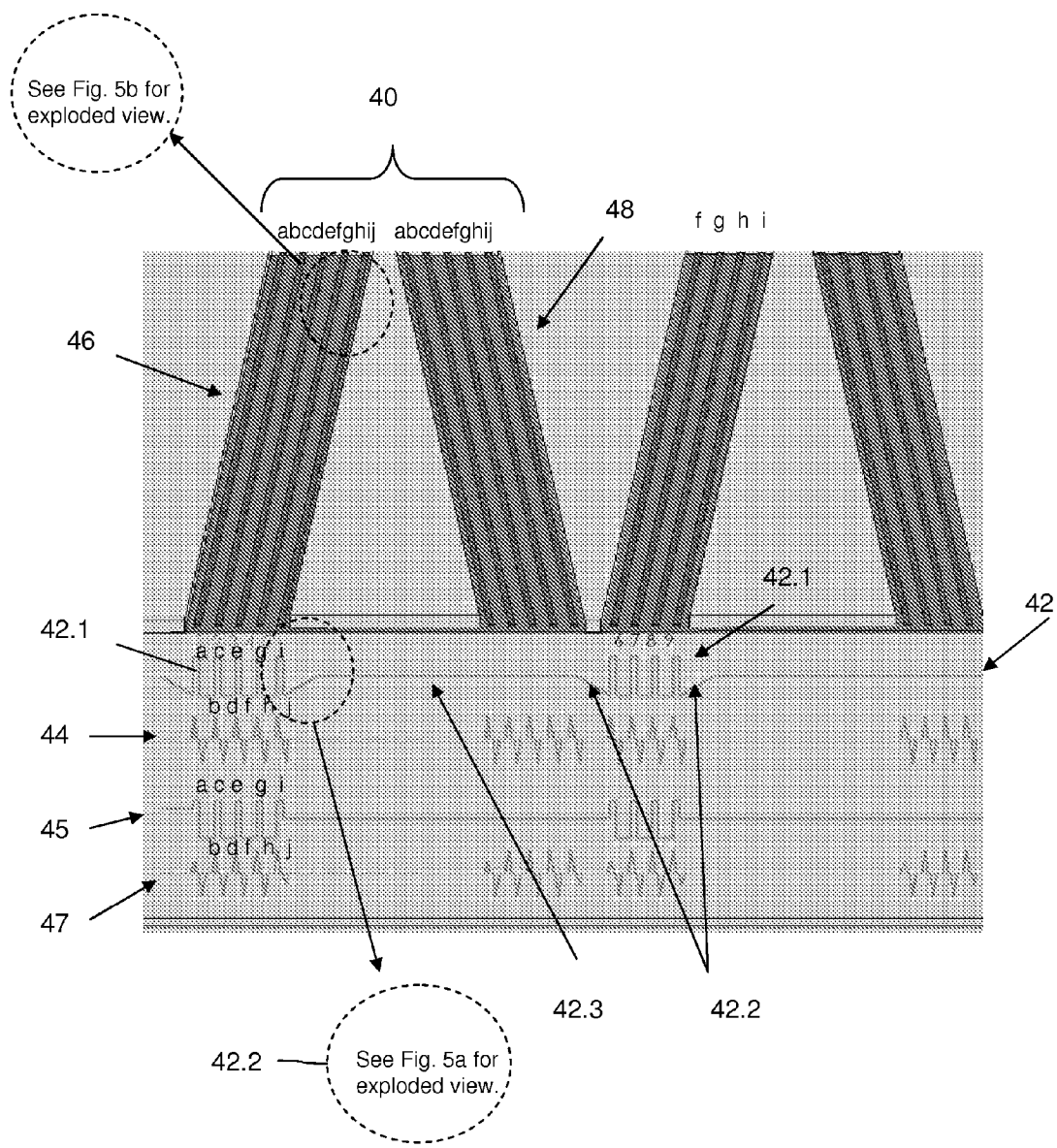
FIG. 4 illustrates a sample recording of a magnetic servo pattern utilizing the apparatus of FIG. 3.

FIG. 4 illustrates an exemplary recording of a magnetic servo pattern 40 utilizing the apparatus of FIG. 3. The timing based servo patterns 40 illustrated are similar to those used in Linear Tape-Open (LTO) tape products. The resultant magnetic pattern 40 comprises a first pattern section 46 and a second pattern section 48 longitudinally offset and symmetrical relative to each other. The first and second pattern section 46 and 48 are each composed of alternating positive and negative bands (a-j). One cannot have the head drivers 30 outputting only positive or negative currents, because the first write element 36 of the head 30 will erase or write over what the second pattern section 48 as it passes over. The solution is to use a three state driver 34 that controls the magnetic head states to be a write state 42.1 (i.e., positive or negative) and can also maintain the magnetic head in a rest state 42.3 during which no write currents are output. Reference No. 45 (driver output signal) illustrates a reading of the pulses 45a-j output from a normally configured tri-state driver 34 when writing a pattern. Reference No. 47 (head read signal) illustrates a reading of corresponding read-back pulses of a tape so formatted. Note that the first pulse 45a and last pulse 45j of the alternating positive and negative pulse sequence are "runt" or more specifically exhibit a smaller amplitude because the magnetic transition before and after the write sequence goes only from zero to positive, and positive to zero, respectively, rather than from negative to positive or positive to negative.

The problem of "runt" signals is solved by gradually returning the pulse to a rest state from a negatively or positively charged current after the last pulse of the first sequence, leaving it at the rest state so that the second write element is not overwritten as it passes by, and then gradually returning the pulse to a negative or positive charge from the rest state before writing the first element of the next sequence (pattern). This can be accomplished by using a current tapering circuit. The more gradual or tapered transition to and from a rest state, the less pronounced the 'runt' signal will be. Reference No. 42 illustrates a reading of the alternating positive and negative pulses 42a-j output from a tri-state driver 34 configured for a gradual (tapered) transition of a write state from and to a rest state before and after writing a pattern, respectively. Ref. 42.1 of 42 illustrates the alternating positive and negative write currents during a write sequence. Ref. 42.2 of 42 illustrates a transition period between a negative current and a rest state 42.3 after the write pattern is complete. Ref. 42.3 of 42 illustrates the rest state, when the magnetic head does not output a write current. Reference No. 44 illustrates a reading of corresponding read-back pulses of a tape so formatted.

Figure 5A:
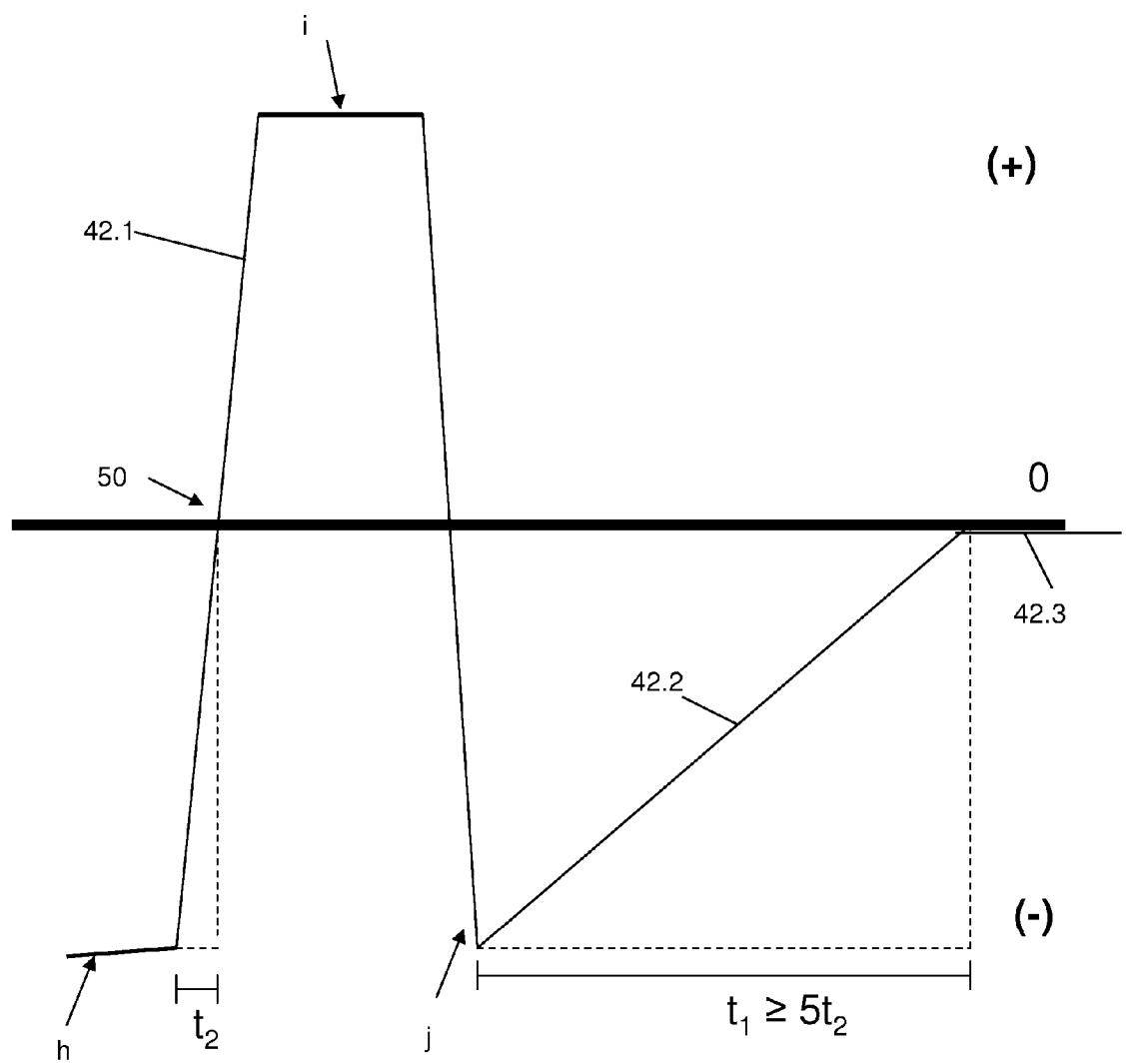
FIG. 5a is a schematic exploded view of a segment of the graph 42 of FIG. 4.
Figure 5B:
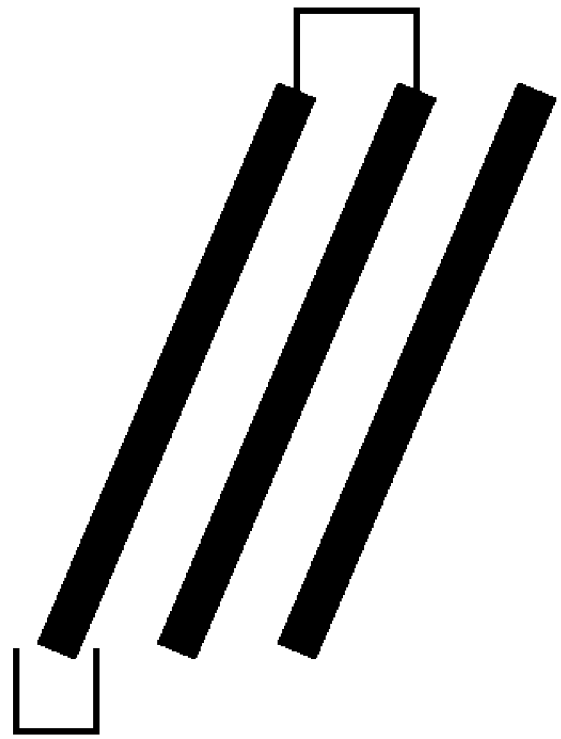
FIG. 5b is a schematic exploded view of a segment of the first pattern section 46 of FIG. 4; and, FIG. 6 is a schematic flow diagram illustrating an embodiment of the method of the invention.

Referring to FIGS. 4 and 5a-b in combination, the time ($t_1$) of transition period 42.2 can be a function of the physical structure of the write pattern. Specifically, $t_1$ should be equal to or less than approximately the time that transpires between the writing of centerlines of two consecutive bands ($t_3$) less the width of a single band ($t_4$) (i.e., the time it takes to put down a single servo band). The tri-state driver 34 allows the write current to range between −1 and +1. The current upon completing the first pattern section can be −1, as illustrated in FIG. 4, or +1. As stated above, this −1 or +1 current should be brought back to zero to prevent recording over a previously recorded portion of the storage media 32 and thus prevent "runt" pulses, when the portion of the storage media 32 containing the second pattern section 48 passes the first angled write element 36.

When alternating between negative and positive write states during a write sequence, there is a point at which neither a negative nor a positive current is output 50. During the write sequence, the transition time $t_2$ between a maximum current output in either a positive or negative write state and the point when neither a negative or positive current is output 50 is significantly more abrupt than the transition time $t_1$ between one of the write states and a rest state. The strength of the read-back signal is proportional to dM/dx, where M is the magnetization in the tape (positive or negative 1) and x is time along the tape (i.e., $t_1$ or $t_2$). The greater $t_1$ (i.e., tapering time before and after a rest state) is the less signal strength it will have. The greater $t_1$ is in relation to $t_2$ (i.e., tapering time to no current output during alternating negative and positive current outputs of a write sequence) the less its proportional signal strength will be. Thus, as the length of time of $t_1$ increases in relation to $t_2$, the likelihood that it will substantially interfere with locating band positions by peak detection or other means is reduced. As stated above, $t_1$ should be equal to or less than approximately the time that transpires between the writing of centerlines of two consecutive bands ($t_3$) less the time it takes to put down one servo band (i.e., the time of the width of a single band ($t_4$)). The value of $t_1$ is preferably at least approximately five times (e.g., 5 times, 10 times, 20 times, etc.) the value of $t_2$ in order to avoid such substantial interference because accurate determination of band location is key to an accurate determination of the servo reader lateral position.

Referring in combination to FIGS. 3, 4, and 5, the tri-state driver 34 of this embodiment is, therefore, configured (e.g., with a current tapering circuit 39) to gradually taper (see ref. no. 42.2) the output from the magnetic head after a rest state (see ref. no. 42.3) to a write state (i.e., a negative or positive current output) before beginning to write a magnetic pattern 40 onto a magnetic storage media 32. It also gradually tapers (see ref. no. 42.2) the output from the magnetic head 30 from a write state (i.e., negative or positive current output) upon completing writing of the magnetic pattern 40 before a rest state. By gradually tapering the output from the magnetic head 30 before and after a rest state, the driver 34 sets down a servo pattern 40 that produces uniform signal pulses upon playback of the magnetic pattern 40 and avoids half amplitude pulses (runt pulses 45a and j) at the beginning and ends of playback of the magnetic pattern. While writing (see ref. no. 42.1) the magnetic pattern 40, the polarity of output is changed more abruptly than when the driver 34 gradually tapers (see ref. no. 42.2) the output from the magnetic head 30 before and after writing the magnetic pattern 40. More specifically, the transition time $t_1$ between a write state, when the magnetic head outputs a negative or positive current, and a rest state, when the magnetic head outputs no current, is preferably configured to last at least five times longer than the like transition time $t_2$, when the magnetic head 30 is writing the magnetic pattern 40 with alternating positive and negative currents, between a maximum positive or negative current and the point when no current is output 50. However, as stated above, $t_1$ should be no greater than approximately the time that transpires between the writing of centerlines of two consecutive bands ($t_3$) less the time it takes to put down one servo band (i.e., the time of the width of a single band ($t_4$)).

Figure 6:
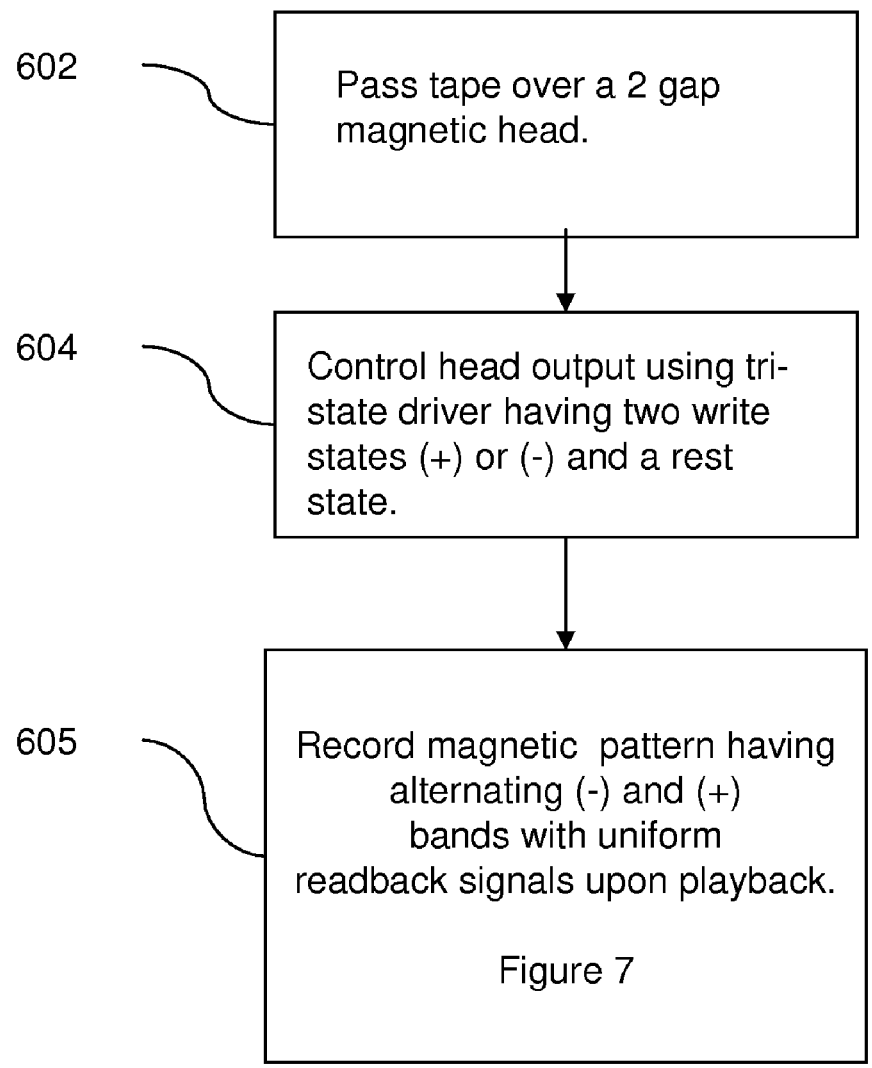
Figure 7:
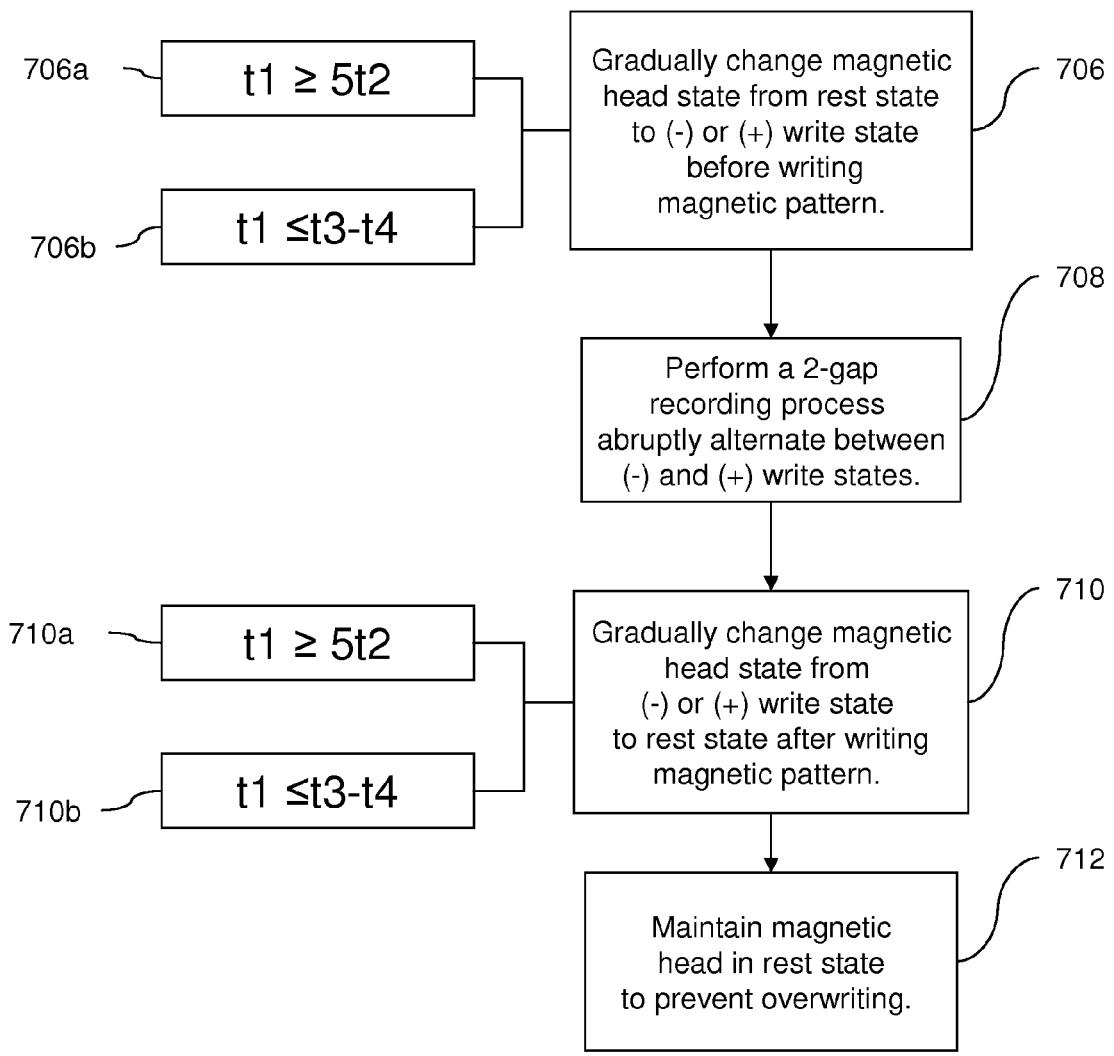
FIG. 7 is a schematic flow diagram illustrating method process 605 of FIG. 6.

Referring to the flow diagram of FIG. 6, another embodiment of the invention is a method of writing timing-based servo patterns on magnetic storage media. A magnetic storage media (e.g., magnetic tape) is passed over a magnetic head 602 (e.g., a two gap recording head). The magnetic head is controlled with a tri-state driver having a negative write state, a positive write state and a rest state 604. The tri-state driver is adapted to record alternating negative and positive pulses on a magnetic storage media during writing of the magnetic pattern 605. The tri-state driver controls output from the magnetic head such that the output is either a negative current or a positive current during the negative and positive write states, respectively, when writing a magnetic pattern onto a magnetic storage media (tape) 604. The driver also controls the magnetic head during rest states such that the magnetic head does not output a write current. Referring to FIG. 7 the recording process 605 is described in greater detail. A two-gap recording process is performed to produce a servo band pattern with alternating uniform (−) and (+) signals upon playback 708. The 2-gap recording process 708 is accomplished by using a first and second angled write element on the magnetic head to write the magnetic pattern on the storage media. The resulting magnetic pattern includes a first pattern section and a second pattern section longitudinally offset and symmetrical relative to each other. Before beginning the write sequence of the two gap recording process 704, the output from the magnetic head is gradually changed from a rest state during which no current is output to a write state during which alternating negative and positive currents are output 706. Then, a write sequence is performed using a 2-gap recording process in which an alternating positive and negative magnetic pattern with abrupt transitions between negative and positive signals is recorded onto the magnetic storage media 708. Once the write sequence 708 is complete, the output from the magnetic head is gradually tapered from either a negative or positive current (i.e., a write state) until the magnetic head is in a rest state during which no current is output 710. Between write sequences the magnetic head is maintained in a rest state 712. This rest state prevents overwriting of the magnetic storage media when the portion of the storage media containing the second pattern section passes the first angled write element.

While writing the magnetic pattern 708, the polarity of the magnetic head output is changed more abruptly than when the driver controls the head to gradually taper the polarity of output before and after entering a rest state (i.e., after and before each write sequence, respectively). By gradually changing the output from the magnetic head at steps 706 and 710, the driver produces uniform signal pulses upon playback of the magnetic pattern and avoids half amplitude pulses at the beginning and ends of playback of the magnetic pattern. When the driver gradually changes the output of the magnetic head (steps 706 and 710), the transition time $t_1$ between a write state, when the magnetic head outputs a negative or positive current, and a rest state, when the magnetic head outputs no current, is preferably configured to last at least five times longer than the like transition time $t_2$, when the magnetic head 30 is writing the magnetic pattern 40 with alternating positive and negative currents, between a maximum positive or negative current and the point when no current is output 50 (see 706a and 710a). However, also as stated above, $t_1$ should be no greater than approximately the time that transpires between the writing of centerlines of two consecutive bands ($t_3$) less the time it takes to put down one servo band (i.e., the time of the width of a single band ($t_4$)) (see 706b and 710b).

The present invention provides an improved method and apparatus for writing timing-based servo patterns on magnetic storage media. The resulting patterns exhibit increased uniform read-back signal strength by providing transitions between bands in the servo pattern that go from positive to negative. These results are accomplished without pre-magnetizing the entire tape or portions thereof and without using a head with three write portions. While the invention has been described in terms of preferred embodiments, those skilled in the art will recognize that the invention can be practiced with modification within the spirit and scope of the appended claims.

What is claimed is:

1. A method of writing timing-based servo band patterns on a linear magnetic tape, said method comprising:

passing said tape over a magnetic head to write a magnetic servo band pattern onto said tape, wherein said magnetic servo band pattern is written onto said tape during a write sequence by performing a gap recording process comprising simultaneously writing with first and second angled write elements of said magnetic head such that said magnetic servo band pattern comprises a first pattern section of parallel bands symmetrical to a second pattern section of parallel bands; and controlling said magnetic head, wherein said controlling of said magnetic head comprises:

controlling said magnetic head with a tri-state driver such that there are three magnetic head states, wherein said three magnetic head states comprise a negative current write state, a positive current write state and a rest state; and controlling said magnetic head during said write sequence such that write current outputs from said magnetic head comprises abruptly alternating negative and positive currents and such that approximately uniform alternating positive and negative read-back signals are produced upon playback of said magnetic servo band pattern, wherein said controlling of said magnetic head during said write sequence further is performed so as to avoid half-amplitude pulses at the beginning and end of said playback of said magnetic servo band pattern.

2. The method according to claim 1, wherein said controlling of said magnetic head further comprises maintaining said magnetic head in said rest state as said second pattern section written onto said tape passes said first angled write element.

3. The method according to claim 1, wherein said magnetic head comprises a tri-state magnetic head that is adapted to record alternating negative and positive pulses on a magnetic storage media during said write sequence.

4. An apparatus adapted to write timing-based magnetic servo bands patterns onto a linear magnetic tape, said apparatus comprising:

a magnetic head comprising a first angled write element and a second angled write element, wherein said first angled write element and said second angled write element are adapted to simultaneously write onto said tape to produce a magnetic servo band pattern comprising a first pattern section of parallel bands that is symmetrical to a second pattern section of parallel bands;

a roller system adapted to pass said tape over said magnetic head; and a tri-state driver adapted to control said magnetic head during a write sequence such that write current outputs from said magnetic head comprise alternating negative and positive write currents and such that approximately uniform alternating positive and negative read-back signals are produced upon playback of said magnetic servo band pattern, wherein said tri-state driver is further adapted to control said magnetic head during said write sequence so as to avoid half-amplitude pulses at the beginning and end of said playback of said magnetic servo band pattern.

5. The apparatus of claim 4, wherein said tri-state driver is further adapted to control said magnetic head such that said magnetic head comprises three states and wherein said three states comprise a rest state and two write states comprising a negative current write state and a positive current write state.

6. The apparatus of claim 4, wherein said tri-state driver is further adapted to initiate said rest state before and after said write sequence to prevent overwriting on said second pattern section as said linear magnetic tape passes said first angled write element.

* * * * *